United States Patent
Albrecht et al.

[11] Patent Number: 6,118,632
[45] Date of Patent: Sep. 12, 2000

[54] MAGNETIC DISK STACK HAVING LASER-BUMP IDENTIFIERS ON MAGNETIC DISKS

[75] Inventors: Thomas Robert Albrecht; Peter Michael Baumgart, both of San Jose; Thao Anh Nguyen, Malibu; Kurt Allen Rubin, Santa Clara; Andrew Ching Tam, Saratoga, all of Calif.

[73] Assignee: International Business Machines Corporation, Armonk, N.Y.

[21] Appl. No.: 08/800,097

[22] Filed: Feb. 12, 1997

[51] Int. Cl.⁷ .......................................................... G11B 5/82
[52] U.S. Cl. .............................................................. 360/135
[58] Field of Search ..................................... 360/135, 131, 360/132, 133; 428/694 TR, 694 BR, 694 SG

[56] References Cited

U.S. PATENT DOCUMENTS

| | | | |
|---|---|---|---|
| 3,593,331 | 7/1971 | Connell et al. | 360/135 |
| 3,899,780 | 8/1975 | Otala | 365/10 |
| 4,121,249 | 10/1978 | Lemelson | 386/128 |
| 4,123,788 | 10/1978 | Kruger | 360/77.03 |
| 4,398,223 | 8/1983 | Lemelson | 386/117 |

(List continued on next page.)

FOREIGN PATENT DOCUMENTS

| | | |
|---|---|---|
| 58-048227 | 3/1983 | Japan . |
| 59-157836 | 9/1984 | Japan . |
| 61-177622 | 1/1985 | Japan . |
| 1-130323 | 5/1989 | Japan . |
| 1-292625 | 11/1989 | Japan . |
| 2-116067 | 4/1990 | Japan . |
| 2-173994 | 7/1990 | Japan . |
| 2-198028 | 8/1990 | Japan . |
| 4-017117 | 1/1992 | Japan . |
| 4-042433 | 2/1992 | Japan . |
| 4-182927 | 6/1992 | Japan . |
| 4-278216 | 10/1992 | Japan . |
| 6-103563 | 4/1994 | Japan . |
| 7-182659 | 7/1995 | Japan . |
| 7-262743 | 10/1995 | Japan . |
| 4-95218 | 8/1996 | Japan . |

OTHER PUBLICATIONS

"Hard Disk Secrets", John M Goodman, IDG Books Worldwide, Inc., copyright 1993, pp. 46–49, 54, 57–60.

*Primary Examiner*—William Klimowicz
*Attorney, Agent, or Firm*—G. Marlin Knight

[57] ABSTRACT

A magnetic disk with nonmagnetic information encoded under, in or above the magnetic layer of the disk is described along with the disk drive using the magnetic disks. The information may be stored as a series of laser-written marks (e.g., bumps, oxidized spots or spots with altered reflectivity) upon the surface(s) of each disk of the disk stack. The set of marks may be a series of laser bumps which serve a dual purpose as a landing zone or contact start/stop (CSS) zone for the slider and as encoded identifying information. During the manufacturing process for disk drives containing the disks, each disk's identifier can be read using outboard equipment such as an HRF tester or by means contained in the drive itself. Each disk identifier can then be stored magnetically in a special region of the hard disk reserved for use by the drive and/or within the flash memory of the hard drive. The drive can then communicate the identifier(s) to a host computer using the conventional communication hardware and firmware. In this way selected information such as the origin, batch number, date of manufacture, serial number, etc. of any disk can be obtained when needed as, for example, as part of failure analysis.

10 Claims, 2 Drawing Sheets

U.S. PATENT DOCUMENTS

| | | | |
|---|---|---|---|
| 4,633,451 | 12/1986 | Ahn et al. | 369/14 |
| 4,698,251 | 10/1987 | Fukuda et al. | 428/64 |
| 4,737,947 | 4/1988 | Osata et al. | 369/13 |
| 4,779,145 | 10/1988 | Lemelson | 360/2 |
| 4,961,077 | 10/1990 | Wilson et al. | 346/1.1 |
| 5,031,162 | 7/1991 | Morimoto et al. | 369/13 |
| 5,067,039 | 11/1991 | Godwin et al. | 360/135 |
| 5,070,425 | 12/1991 | Inumochi | 360/135 |
| 5,168,413 | 12/1992 | Coker et al. | 360/137 |
| 5,175,425 | 12/1992 | Spratte et al. | 235/494 |
| 5,210,672 | 5/1993 | Ivers et al. | 360/135 |
| 5,373,403 | 12/1994 | Okamura et al. | 360/67 |
| 5,402,278 | 3/1995 | Morita | 360/77.05 |
| 5,427,833 | 6/1995 | Nakayama et al. | 428/64 |
| 5,450,379 | 9/1995 | Fujimori et al. | 369/275.1 |
| 5,488,519 | 1/1996 | Ishida et al. | 360/77.03 |
| 5,504,646 | 4/1996 | Tanaka et al. | 360/135 |
| 5,550,696 | 8/1996 | Nguyen | 360/135 |
| 5,576,918 | 11/1996 | Bar-Gadda et al. | 360/135 |
| 5,586,040 | 12/1996 | Baumgart et al. | 360/135 X |
| 5,593,341 | 1/1997 | Gonnella et al. | 451/57 |
| 5,633,569 | 5/1997 | Cloupek et al. | 318/430 |
| 5,633,570 | 5/1997 | Motzko | 318/439 |

1 0 1 0 1 1 0 1 1 0

MAGNETIC DISK STACK HAVING LASER-BUMP IDENTIFIERS ON MAGNETIC DISKS

Related Application

In co-pending and commonly assigned U.S. application Ser. No. 08/795,579 a method of, now U.S. Pat. No. 5,907,144 bar coding disks is described.

FIELD OF THE INVENTION

The invention relates to magnetic disks with nonmagnetic encoded identifying information on magnetic disks, methods for creating the magnetic disks and storage device containing the magnetic disks. More particularly the invention relates to methods for using laser heating to encode nonmagnetic information under, in or above the magnetic material on magnetic disks.

BACKGROUND OF THE INVENTION

In order to perform failure analysis and ultimately to correct failures in storage devices (disk drives) it may be necessary to determine certain information about the magnetic disk(s) used in the drive. There may be multiple locations where the disks are manufactured. The manufacturing process may change from time to time. There can be many reasons why it might be necessary or useful to know such information as the date that a disk was manufactured, the batch number or even a unique identity of a disk so that information as its origin may be correlated with other information such as failure rates. Since disk drives must generally remained sealed in order to continue to function properly, visible markings on the disks may not be viewable without damaging the drive. The magnetic surfaces of the disks must be extremely smooth with peak-to-valley roughness of the magnetic surfaces of some thin film disks being less than 100 Angstroms. In addition there are tribological constraints on materials and physical structures on the magnetic surfaces. Thus, the extremely fine tolerances and properties required for proper functioning of a magnetic disk render conventional marking schemes impractical.

SUMMARY OF THE INVENTION

The present invention is a magnetic disk and a disk drive using the disk. The magnetic disk has nonmagnetic information encoded under, in or above the magnetic layer of the disk. The information may be stored as a series of laser-written marks (e.g., bumps, oxidized spots or spots with altered reflectivity) upon the surface(s) of one or more disks of the disk stack. The set of marks may be a series of laser bumps which serve a dual purpose as a landing zone or contact start/stop (CSS) zone for the slider and as encoded identifying information (identifier). During the manufacturing process for disk drives containing the disks, each disk's identifier can be read using outboard equipment such as an HRF tester or by means contained in the drive itself. Each disk identifier can then be stored magnetically in a special region of the hard disk reserved for use by the drive and/or within the flash memory of the hard drive. The drive can then communicate the identifier(s) to a host computer using the conventional communication hardware and firmware. In this way selected information such as the origin, batch number, date of manufacture, serial number, etc. of any disk can be obtained when needed as, for example, as part of failure analysis.

DETAILED DESCRIPTION OF THE PREFERRED EMBODIMENTS

Figure 1:
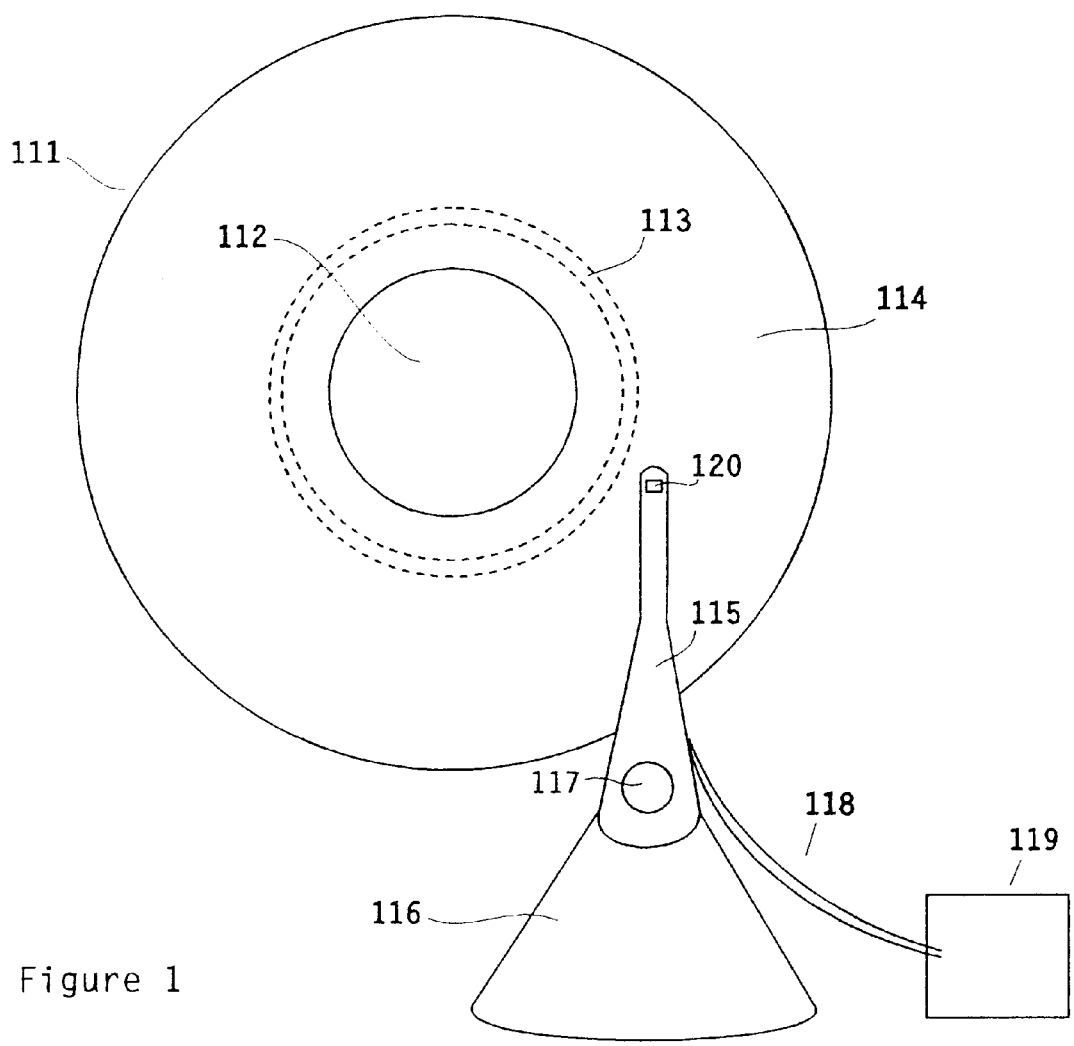
FIG. 1 is a top view of a prior art disk drive with a rotary actuator useful in practicing the present invention.

FIG. 1 is a top view of a prior art disk drive with a rotary actuator useful in practicing the present invention by having a information encoded by laser-written marks under, on or in the magnetic layer of the disk. The system comprises one or more magnetic recording disks 111 mounted on spindle 112 which is rotated by an in-hub electrical motor (not shown). An actuator assembly 115 supports a slider 120 which contains one or more read/write heads. The assembly may be composed of a plurality of actuators and sliders arranged in a vertical stack with the actuators supporting the sliders in contact with the surfaces of the disks when the disks are not rotating. A voice coil motor (VCM) 116 moves the actuator assembly 115 relative to the disks by causing the assembly to pivot around shaft 117. The heads are contained in air bearing sliders adapted for flying above the surface of the disks when rotating at sufficient speed. In operation, when the sliders are flying above the disks the VCM moves the sliders in an arcuate path across the disks allowing the heads to be positioned to read and write from circular tracks formed in the data area 114. Electrical signals to and from the heads and the VCM are carried by a flex cable 118. The various electronics required for signal processing, control and communication are represented by block 119. When not operating and during periods when the rotation of the disks is either starting or stopping, the sliders are positioned in physical contact with the surface of the disks in a landing zone or contact start/stop (CSS) area 113 which is not used for data storage even though the magnetic coating extends over this area. The CSS area is not shown to scale in this figure. The actual size of the CSS area is typically a few millimeters. The CSS area is typically located near the inner diameter (ID) of the disk as shown, but other locations are possible including the use of multiple CSS areas spread across the disk. There is typically a latch mechanism (not shown) which holds the sliders in position over the CSS when the drive is not operating and at least temporarily during start up. In a preferred embodiment of the invention laser bumps containing the encoded information are placed in the CSS area. The entire disk drive assembly is located within a sealed housing (not shown) to prevent contamination. Although the disk drive has been described with air bearing sliders the principles of the present invention may easily be applied to other storage devices having near contact, or contact recording sliders.

The substrate may be an aluminum alloy coated with NiP, glass, glass-ceramic or any substance which can be induced to form bumps when heated by a laser. The process of forming the bumps on substrates is known in the art as laser texturing and is not part of the current invention. Techniques and references for laser texturing are described inter alia in U.S. Pat. No. 5,550,696 titled "Magnetic recording disk having textured test band for controlling texture in the slider landing zone." Co-pending application, U.S. Ser. No. 08/149,851 filed Nov. 10, 1993 and commonly assigned, describes a process for laser texturing glass disk substrates. Commonly assigned co-pending application U.S. Ser. No. 08/150,525 filed Nov. 10, 1993, which is incorporated herein, by reference describes a programmable laser texturing tool. Basically a computer is used to control a shutter through which the laser beam passes and a translation stage on which the disk is rotated and moved laterally. In this way the duration of the laser pulses, the time between the pulses and the focal point on the disk are controllable and can, therefore, be used to create the necessary pattern of bumps to implement the invention.

After texturing additional layers of distinct material are typically sputtered onto the disk. Typical layers include an under layer of chromium, a cobalt alloy magnetic layer and a protective layer of carbon or hydrogenated carbon. The pattern of the bumps will be preserved and reflected in the additional layers.

In the preferred embodiment the CSS area 113 contains a generally spiral pattern formed from ten of thousands of bumps, e.g. approximately 67,000 bumps would be a typical number. The bumps are spaced to form a 3 mm wide landing zone. In order to encode information for the magnetic disk within the CSS zone, laser bumps formed within the CSS zone are encoded in accordance with the present invention. Any type of useful information about the disk may be encoded in the bumps, such as the origin, batch number, date of manufacture, serial number, etc. This information will be referred to as the disk identifier even though it may or may not actually identify the disk uniquely.

Although the preferred embodiment of the invention uses laser bumps, in various other embodiments the information is encoded on the disk as a plurality of other types of marks made on the surface of the disk by a laser. These marks can be any geometric shape that extends or insets from the surface of the disk. Using the prior art technique laser bumps can be produced in various shapes including sombrero-like bump, an annular ring or a mound. In other embodiments, nontopographic marks are formed by focusing a laser beam to heat the disk sufficiently to cause a physical change to the properties of one or more layers of the disk. For example, using the laser to heat spots on a carbon overcoat layer will cause a detectable optical change. A magnetic layer could be caused to oxidize locally by heating a spot in the presence of oxygen which would also create an optically detectable change.

In the preferred embodiment, laser bumps are nonmagnetic in that the bumps are physical features formed on the surface of the disk substrate which is nonmagnetic. The fact that the subsequently sputtered magnetic layer will be locally deformed by these bumps will create variations in measurable magnetic parameters as will be seen. The disk information is encoded by modulating the bump spacing, bump height, or bump diameter (or shape) and can be located anywhere on the disk. In a preferred embodiment, the identifying information is encoded within the CSS zone by creating small modulations (tens of microns) in the laser bump's spacing. By using the bump spacing for the encoding, the apparatus is simplified since the laser power and on-time remains constant. Many different encoding schemes could be used. An RLL scheme is described below, but others are possible. For example, an event such as a double length space between bumps could be designated as a '1' and a single length space a '0'. Once the binary code has been defined, multiple bits are then used to form larger units such as 8 bit bytes. Any sort of encoding scheme useful with computers can be used once the binary code has been established.

There is an advantage in using an encoding scheme which keeps the overall bump density within the CSS zone constant, and therefore has minimal impact on the tribology. Since there are many laser bumps (e.g. 200) under the area covered by a typical slider, the laser bumps may be encoded with the disk identifier without causing any adverse performance of the zone texturing, as it is currently used in the art.

Figure 3:
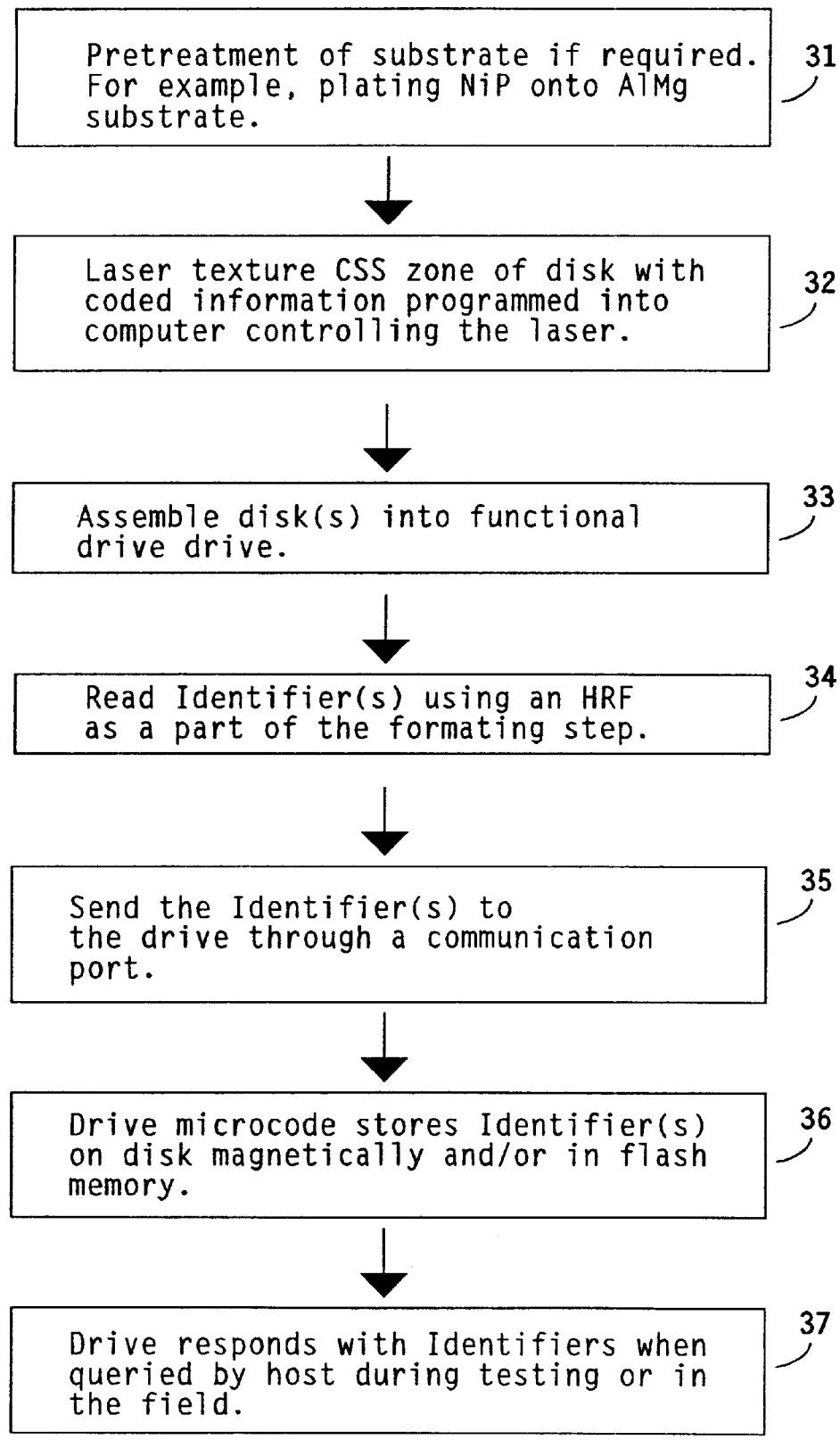
FIG. 3 is a flowchart of a manufacturing process for a disk drive using the invention.

FIG. 3 illustrates a method of manufacturing a disk drive using the invention. The substrate may require pretreatment. Typically AlMg substrates are plated with NiP and polished as an initial step 31. Other substrates may not require any pretreatment of this type. The prepared substrate in then laser textured. The computer controlled laser is used to create the bumps in the CSS zone. The pattern in which the bumps are created encodes the desired 32. The disk(s) are then progressively assembled into a functional disk drive using conventional techniques 33. The identifier(s) can be read at any convenient point during the manufacturing process and/or use of the completed disk drive. It is particularly convenient to read the identifiers at the station where the disks are formatted after being included in the drive. At the formatting station the identifier can be read using a specific Harmonic Ratio Flyheight (HRF) tester that detects changes of flying height associated with the read head on the slider passing across a laser bump within the CSS zone 34. The design and use of an HRF tester is known to those skilled in the art and does not form a part of this invention. A local fly height change caused by passing over a bump results in a change in the spectral content of the readback pulses sensed by the read head. A bump is detected by sensing the changes in harmonic ratios in the readback signal. Each bump is reflected as a change in flying height. From the stream of digital values read from the tester, a disk identifier (ID) can easily be decoded. The identifier(s) can be communicated to the drive through a communication port on the drive which can either be the interface used to communicate with the host computer (e.g. SCSI or IDE) or it can be a port used only during manufacturing or disk servicing 35. The identifier(s) can then be stored in conventional form along with the drive microcode and/or other parameters by action of the microcode in the drive 36. The ID may be stored in any nonvolatile storage such as PROMs, EEPROMs, flash memory, etc. and/or on the disk in conventional magnetic form. Thereafter, whenever the disk drive is powered up, this disk ID (or multiple IDs for a disk stack) are retrievable. Storage of the IDs in a flash memory allows the disk drive to recover the information even if a malfunction results in inability to read data from the disk. Since prior art disk drives already have means for communicating certain status and identity information such as microcode version to a host, the disk identifiers can easily be included in such information. It would probably be necessary to create a new command in the microcode for the drive to allow the drive to accept the identifiers from the communication port and then store them. A new command which the host could send to the drive could also be created for the purpose of reading the identifiers. Either by using conventional query commands or a unique command to read the identifiers a host computer can then read the identifiers as a part of the testing process of the drive or in the field 37.

Alternatively, other methods besides HRF testing could be used to read the disk identifier encoded within the laser bumps. For example, direct image recognition of the coded laser marks could be performed using an image magnifying system. In another embodiment, MR read head temperatures can be used to sense a disk ID pattern of marks. Generally, baseline shifts that occur as the result of MR head temperature changes induced by passing over topographic features are filtered by ARM electronics. However, for purposes of reading the disk ID, this filtering is turned off and the baseline shift associated with MR head passing of the laser written bump or other topographic feature is sensed.

The above embodiment is advantageous as it is consistent with existing equipment for manufacturing the laser texture on a magnetic disk formed within a standard CSS zone, as well as the monitoring tools (e.g. LaTA and ReGA) to control the production. In addition, if the preferred constant density of bumps is used there will be no change in the tribology and flying characteristics from that of a standard magnetic disk. A constant density of bumps although preferable may not be required to ensure adequate stiction protection. As long as the practical minimum (and possibly maximum) number of bumps under the slider is not violated, a pattern may be usable even it does not have a constant density of bumps. As will be appreciated, a number of methods of encoding the data within the laser bumps can be implemented in alternative embodiments. One method of achieving on average a constant number of bumps per unit length is to use an RLL code such as the one described below.

Figure 2:
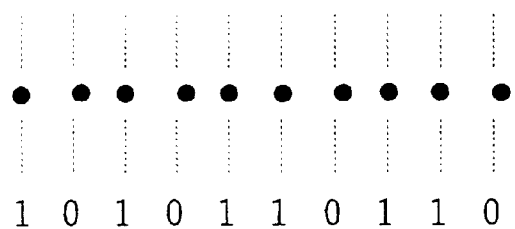
FIG. 2 shows an expanded view of an RLL symbol encoded in a sequence of laser marks according to an embodiment of the invention.

As seen in FIG. 2, a sequence of ten laser bumps is shown to illustrate a possible RLL symbol encoding. The bumps all have the same dimensions, but the spacing between adjacent bumps along a spiral track is varied in accordance with a preferred encoding scheme. Each laser bump is written on its corresponding CSS zone track either on a synchronized or shifted in time by some fixed amount, say 10% in time. This shifting is chosen to be either forward or backward in time, but not both, to keep the coding binary. For purposes of illustration, in FIG. 2 a '1' is defined as not shifted relative to the synchronized clock and a logical '0' as shifted forward. The clock boundaries are shown by the vertical dashed lines. A disk ID could be encoded using a "sector" consisting of a sync mark followed by four symbols. The sync mark consists of ten "zeroes". Each of the succeeding four symbol consists of ten bits. The first two bits are a 1 followed by a 0 and constitute the byte header. This distinguishes the data bytes unambiguously from the sync mark. The subsequent eight bits can have any value. The sequence of bumps shown in FIG. 2 corresponds to the binary number '10110110' prefixed with the '10'. The possible number of disk IDs that can be written using four symbols in this encoding scheme is $2^{(8 \times 4)}$, or more than $4.29 \times 10^9$. There may, of course, be more than 4 symbols or multiple sets of sync marks followed by symbols which would allow a very large amount of information to be recorded if desired.

The result of timed-shifting the laser bumps by a single fixed amount results in three different gaps. In the sector sync mark, each bump is separated by a medium length gap. In the data area, the spacing can be either be shorter, equal to, or longer than the channel clock distance, depending upon the encoding method chosen. For example, a 0 followed by a 1 has a short gap space, and a 1 followed by a 0 has a long gap space. Both a 1 followed by a 1 and a 0 followed by a 0 have a medium length gap space. In that case, the set of bytes intended is discerned by the synchronization with the sync mark.

In an alternative embodiment, the marks are read using a magnetic read/write head. The write head is used to write a magnetic pattern, such as a square wave tone around the circumference of the disk that traverses both the magnetic layer covering the bumps and the region in-between. The read head is sensitive to spacing between itself and the magnetic layer it is reading, such that signal amplitude will vary with varying spacing. When sensing the disk ID, the read head signal amplitude becomes larger if the spacing decreases due to topography of bumps and becomes smaller if the spacing increases. Thus, changes in signal amplitude are used as an indication of the presence of a local change in fly height and to sense the presence of a mark.

In a preferred embodiment, the codes are written repeatedly on a large number of spiral tracks within the CSS zone such that, given the mechanical tolerance of the disk drive, the read head is guaranteed to be over part of the coded CSS zone when the disk drive read head is latched over the CSS zone. It is desirable that no servo circuitry be needed to keep the head located over the disk ID laser bumps. Rather, the head is allowed to be located anywhere in the encoded region and the actuator is kept at a fixed radius without the feedback from the servo system being required.

In order to guarantee that the disk ID will be read more than one time no matter where in the CSS zone the read head is located, the disk ID is repeated a number of times within the encoded laser bumps. This allows for a large amount of manufacturing tolerance associated with the location of the actuator latch relative to the laser bumps encoded with the disk ID within the textured zone of CSS zone. As an example, suppose 32 bits of information are stored within the laser bumps to uniquely identify a magnetic disk. In the encoding scheme described above, 50 adjacent laser bumps are needed to encode this disk ID. Ten adjacent bumps are for the sync mark and 40 bumps are used for the four 10-bit symbols. Since one rotation of a common magnetic disk contains about 1,068 bumps, the identifier can be written 22 times per revolution of the disk. If we allow only for detecting bumps that have an effective readback size that is between 80% and 100% of the laser bumps radius, bumps can be read ±4.5 µm from the bump's center for a 15 µm diameter laser bump. This results in the entire code being read redundantly three times for enhanced error detection. A higher degree of redundance can be obtained by making the marks more closely spaced or allowing for a larger range of effective readback lengths. There are a total of approximately 60 revolutions in the textured zone, so that the redundancy can be repeated a total of 1,082 times. This insures the disk ID written on the textured zone will be easily recovered by reading one full rotation of the disk at any radial position.

If a substantial amount of redundancy is used in writing the disk ID within the textured zone, this provides a form of error correction coding so that no special correction coding is needed. However, if desired, a simple layer of error correction coding could be added to the encoded information to add reliability. As will also be appreciated, this scheme allows the detection channel of the disk drive to decode the disk ID by post-processing to identify the sync and complete code. Alternatively, a phase locked loop could be implemented for real-time decoding. As will further be appreciated, simpler methods of encoding could be used in which a code that encodes intervals only is implemented. However, this has a disadvantage of not keeping the bump density exactly constant. The density in that case would depend on the ratio of 1's to 0's.

While the invention has been particularly shown and described with reference to a preferred embodiment, it will be understood by those skilled in the art that various changes in form and detail may be made therein without departing from the spirit and scope of the invention.

We claim:

1. A storage device comprising:

a disk with a surface having a thin film layer of magnetic material covering a first region;

a plurality of bumps in or on the surface in the region under the thin film layer of magnetic material, the plurality of bumps encoding selected information independent of any data recorded in the magnetic material covering the bumps, the selected information being encoded in variations in physical parameters of the bumps or in spacing between the bumps, the bumps being generally disposed in a ring around a central hole in the disk, the ring of bumps forming a contact start/stop (CSS) zone of the disk;

a slider;

means for rotating the disk; and means for moving the slider to the CSS zone during a power down sequence whereby the slider will be in contact with a plurality of bumps when the disk is not rotating.

2. The storage device of claim 1 further comprising:

means for reading the variations; and means for converting the variations into the selected information by decoding the variations in the bump spacing, bump height, bump diameter or bump shape.

3. The storage device of claim 2 wherein the means for reading the variations further comprises a magnetic read head positionable over the bumps while the disk is rotating, the magnetic read head detecting magnetic field variations caused by variations in the bump spacing.

4. The device of claim 1 wherein the bumps form a plurality of symbols which are composed of a predetermined number of bumps with modulated spacing between the bumps.

5. The device of claim 1 wherein the bumps form a plurality of symbols which are RLL encoded symbols.

6. The device of claim 1 further comprising:

means for communicating with a host computer;

means for reading the selected information from the disk by detecting magnetic field variations when the disk is rotating caused by variations in the spacing of the bumps;

means for storing the selected information in nonvolatile storage; and means for transmitting the selected information to the host computer.

7. A magnetic disk for use in a storage device comprising:

a circular substrate with a planar surface;

a planar layer of magnetic thin film material parallel to the planar surface covering a first region of the planar surface; and a plurality of substantially circular bumps in the planar surface under the thin film magnetic material, the bumps having a reflectivity not equal to the reflectivity of adjacent material on the planar surface, the bumps being arranged in patterns to encode selected information in variations in physical parameters of the bumps or in spacing between the bumps, thereby encoding the selected information independently of any data recorded in the magnetic material, the bumps being generally disposed in a ring around a central hole in the disk in a contact start/stop zone on the magnetic disk.

8. The magnetic disk of claim 7 wherein the bumps were formed by heating spots with a laser.

9. A method of manufacturing a storage device comprising the steps of:

forming a plurality of bumps on a ring-shaped contact start/stop portion of a surface of a disk substrate, the bumps encoding selected information in variations in physical parameters of the bumps or in spacing between the bumps;

sputter depositing a magnetic thin film over the surface including the bumps, the magnetic thin film conforming to the contours of the bumps to form a magnetic disk with the selected information being independent of any data subsequently recorded in the magnetic thin film;

assembling the magnetic disk into a storage device having nonvolatile storage;

reading the selected information encoded in the bumps from the magnetic disk; and storing the selected information in the storage device in the nonvolatile storage.

10. The method of claim 9 wherein the reading step is performed by a manufacturing apparatus which is not part of the storage device and the method further comprises the step of transmitting the selected information to the storage device.

* * * * *